May 26, 1931.  B. C. ENGLAND  1,807,474
TRANSPLANTER
Filed Nov. 16, 1929   3 Sheets-Sheet 3
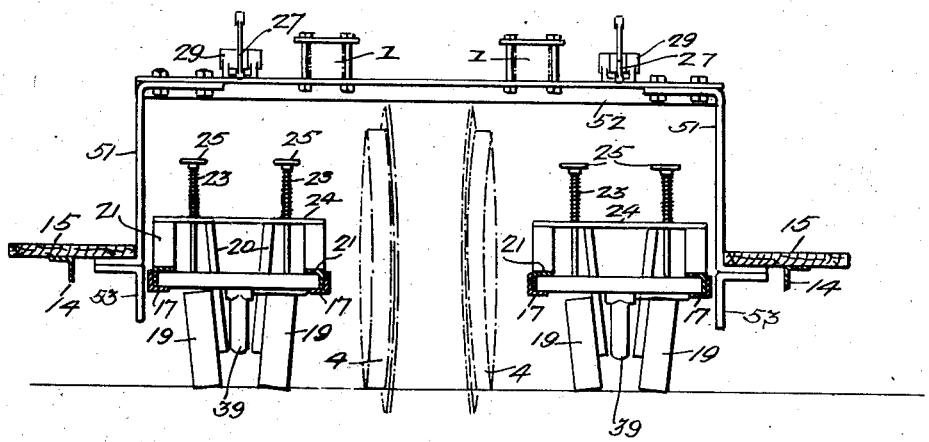
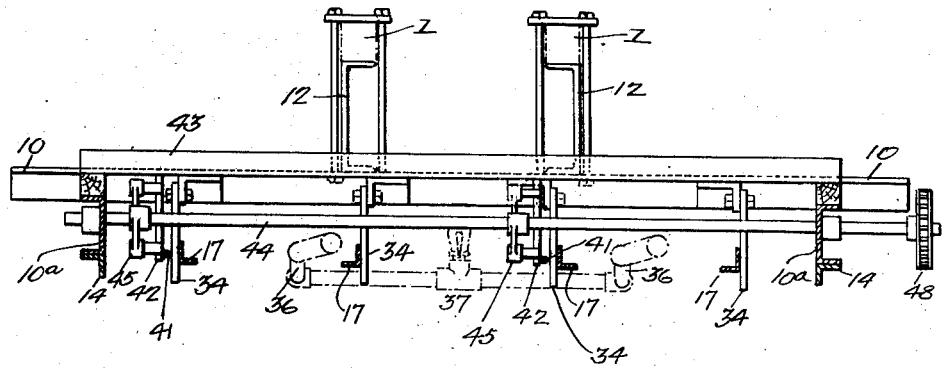

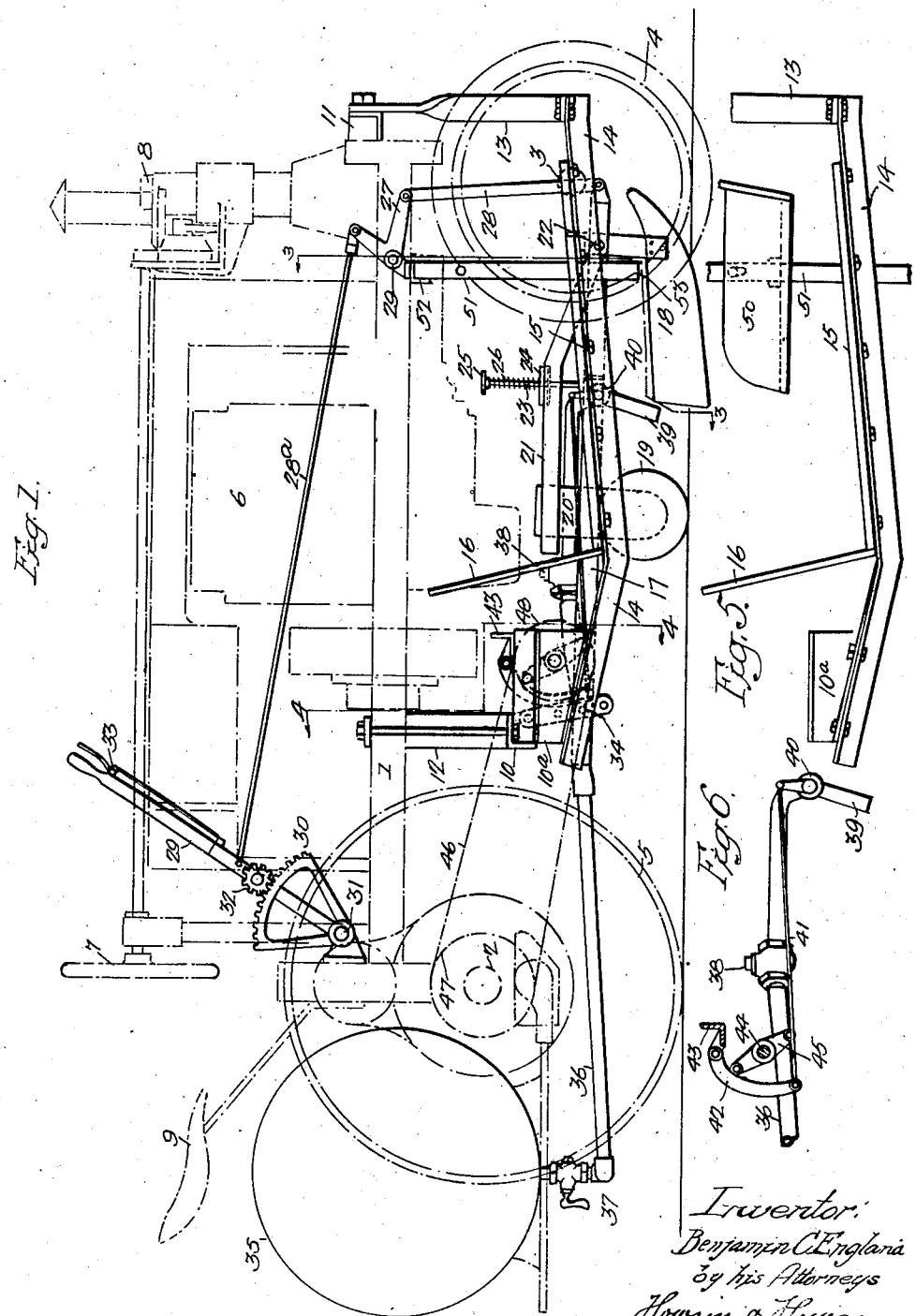

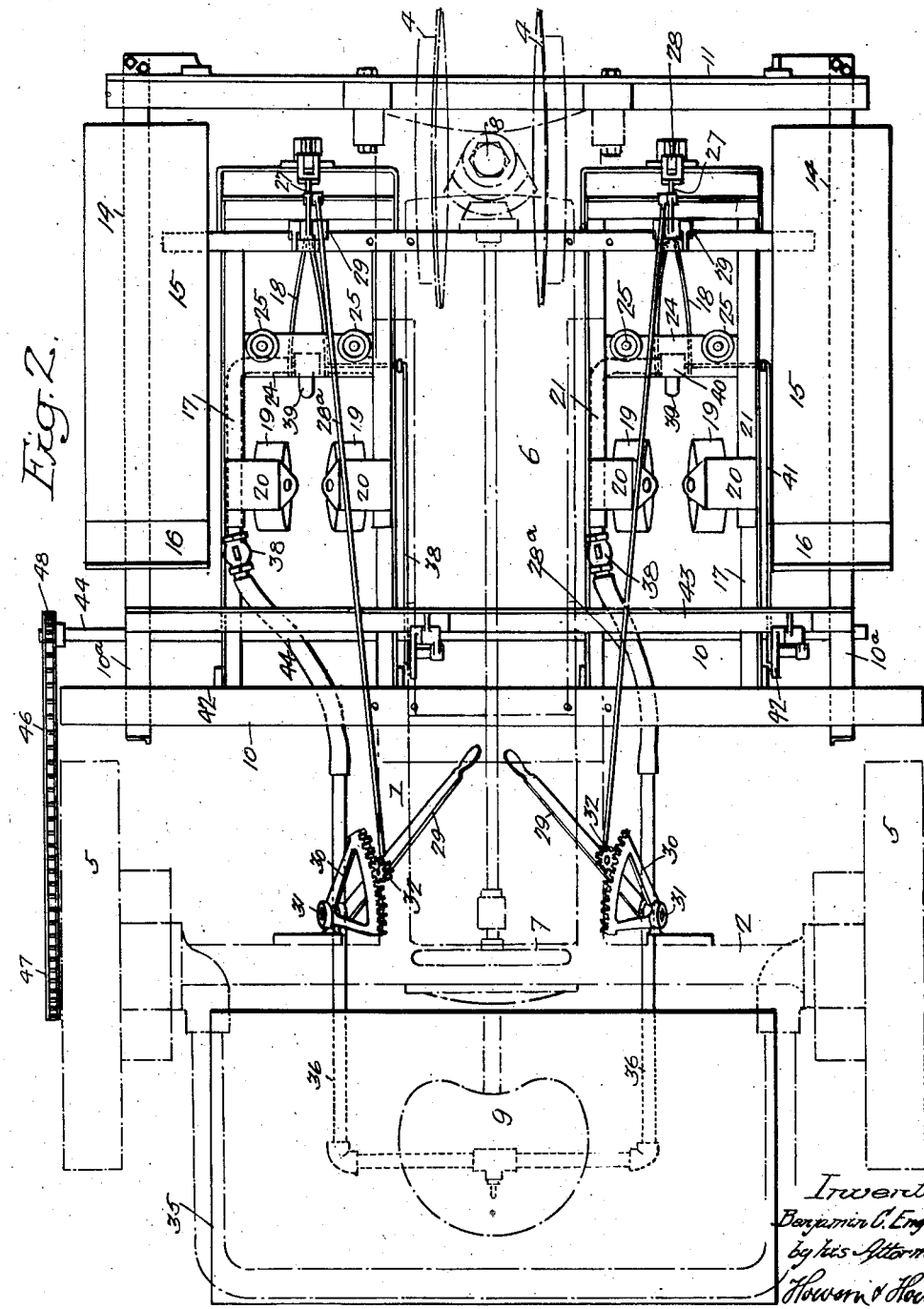

Patented May 26, 1931

1,807,474

UNITED STATES PATENT OFFICE

BENJAMIN C. ENGLAND, OF PEDRICKTOWN, NEW JERSEY

TRANSPLANTER

Application filed November 16, 1929. Serial No. 407,697.

The object of my invention is to mount on a tractor the transplanting attachments.

A further object of the invention is to so locate the transplanter between the center lines of the forward and rear axles that the transplanter will take up comparatively little room, and can be turned in a very small space.

The invention also relates to certain details of construction which will be fully described hereinafter.

In the accompanying drawings:

Fig. 1 is a side view of my improved transplanter;

Fig. 2 is a plan view;

Fig. 3 is a transverse sectional view on the line 3—3, Fig. 1;

Fig. 4 is a transverse sectional view on the line 4—4, Fig. 1;

Fig. 5 is a detached view of one of the seat frames; and

Fig. 6 is a detached view of one of the water pipes.

In the drawings, I have shown the transplanting mechanism in full lines and the tractor in dotted lines, and while I have shown a particular type of tractor, it will be understood that the invention can be applied to other types without departing from the essential features of the invention.

1 is the frame of the tractor. 2 is the rear axle, and 3 is the forward axle on which are mounted the guiding wheels 4, which are comparatively close together. 5 are the traction wheels, which are driven from the internal combustion engine 6, which is mounted on the frame 1 through the ordinary gearing not shown. 7 is the steering wheel, which is connected to a vertical shaft 8, through shafts and gearing shown in dotted lines in Fig. 2. 9 is the driver's seat.

Hung from the frame 1 of the tractor is a cross-beam 10, located substantially midway between the forward and rear axles as shown in Fig. 1, and secured to the forward end of the frame 1 is a cross-beam 11. These two beams, in the present instance, are angular beams, but it will be understood that they may be other shapes without departing from the essential features of the invention.

Straps 12 connect the beam 10 with the frame 1, and straps 13 are secured to the beam 11, and are attached to longitudinal seat beams 14. The rear end of each seat beam 14 is attached to a casting 10a, which is secured to the transverse beam 10. The seat beams 14 are located one at each side of the tractor as shown in Fig. 2, and each seat beam 14 supports a seat platform 15, which is provided with a back rest 16. The person doing the transplanting is seated on the platform and leans against the inclined back-rest 16, so that he will be in position to conveniently transplant in the rows.

A transverse beam 52 is located between the radiator and the steering column of the tractor. Depending from each end of the beam 52 is a hanger 51. Each hanger extends under the inner edge of a platform 15, as shown in Fig. 3 and aids the seat beam in supporting the platform. Secured to the lower end of each hanger 51 is a guide 53. These guides limit the outward movement of the frames 21, which carry the plows 18, the wheels 5 limiting the inward movement of the frames. The transverse beam 52 also carries the beams 29 to which levers 27 are pivoted.

A special box 50 is provided with means by which it can be hooked into each hanger 51, as shown in Fig. 5. This box holds the plants which are used in transplanting as it is in close proximity to the person occupying the platforms.

Between each seat and the body of the tractor is a frame 17, which carries a furrow marker or plow 18, and spaced back of this furrow marker are two compacting wheels 19. The space between the two is sufficient to allow the person occupying the seat to drop a plant into the furrow, and the wheels 19 will cover the roots of the plant and compact the ground around it.

The wheels, in the present instance, are mounted in bearings 20, depending from an auxiliary frame 21, which is pivoted at 22 to the main frame 17. Rods 23 are attached to the main frames 17, and extend through a cross-bar 24, which is fastened to the auxiliary frames 21, and between a head 25 on these rods, and this cross-bar, are springs 26, which yieldingly support the rollers 19, so that they will yield when passing over uneven ground. The forward end of each main frame 17 is connected to one arm of a bell crank lever 27 by a link 28. This bell crank lever is pivoted to the bearing 29 on the beam 52. The other arm of the bell crank lever 27 is connected by a rod 28a to an operating lever 29. A fixed segment 30, the center of which is taken from the pivot 31 of the operating lever, is engaged by a pinion 32 on the lever 29, and this pinion is actuated by a latch lever 33 for locking the lever 29 in any position to which it is adjusted. By operating the lever 29, the frames 17 can be elevated on their pivots 34, so as to regulate the depth of the plow or furrow marker 18.

At the rear of the tractor is a water tank 35. Connected to the bottom of the tank is a pipe 36, having a shut-off valve 37. This pipe is forked and extends on each side of the tractor as shown in Fig. 2, and each branch extends along the left side of the frame 17 as seen from the driver's seat. Each branch of the pipe is provided with a valve 38. The pipe extends parallel with the frame 17 and has a nozzle 39, from which water escapes to the furrow so that the ground is moistened before the plant is located in the furrow. In the present instance, the pipe 36 has an automatic shut-off valve 40, on which is a lever which is connected by a rod 41 to an arm 42, pivoted to a cross-bar 43. 44 is a transverse shaft having arms 45, which engage the arms 42 and as the shaft 44 revolves, the valve 40 will be turned on and off automatically. The shaft 44 is driven, in the present instance, from the main shaft 2 of the tractor by a chain 46, which passes around a sprocket wheel 47 on the shaft 2, or on the traction wheel 5 and around a sprocket wheel 48, on the shaft 44, Fig. 2.

I lay no claim in this application to the particular arrangement of the water supply apparatus, nor to the means for raising and lowering the furrow marker and the covering wheels.

By the above construction, it will be seen that I can provide a tractor with transplanting devices 1, located on each side of the body of the tractor, and these transplanting devices are located between the lines of the front and rear shaft, so that the machine occupies a comparatively small amount of room and can be readily turned on a small compass, as no part of the transplanting devices extends beyond the tractor. Sufficient room is provided for the proper handling of the plants, and the furrow marker as well as the covering wheels can be readily manipulated. Water is supplied to the furrow from a tank at the rear of the tractor, as stated above.

I claim:

1. The combination in a transplanter, of a tractor having front and rear wheels, a furrow marker and covering wheels; a frame for supporting said furrow marker and the covering wheels; two seat beams, one located on the one side of the tractor and the other on the opposite side of the tractor; two cross-beams, one in the forward end of the tractor and the other in advance of the main traction wheels of the tractor; means for suspending the seat beams from these two cross-beams; and platforms on each beam and a back rest on each beam, the mechanism being located between the front of the tractor and the rear traction wheels of the tractor.

2. The combination in a tractor having a frame and front and rear axles, of two cross-beams; a longitudinal seat beam on each side of the tractor and secured to the cross-beams; a transverse beam back of the forward cross-beam and having a hanger extending downward from each end of said beam; a transplanter frame between each seat beam and the front wheels of the tractor; a guide secured to each hanger, said guides limiting the lateral movement of the frame of the transplanter in one direction, and the wheels of the tractor limiting the lateral movement of the said frame in the other direction.

3. The combination in a tractor having a frame and front and rear wheels; front and rear cross beams secured to the frame; longitudinal seat beams secured to said cross beams; platforms on the seat beams; a third transverse beam located between the other two beams and secured to the frame, said last-mentioned beam having depending hangers for aiding the said beams in supporting the platforms; a transplanting frame located on each side of the tractor between the said hangers and the front wheels; a bearing on the third beam on each side of the tractor frame; a lever pivoted to the bearing; and a rod connecting one arm of the lever to the transplanting frame, the other arm of the lever being connected to tracting mechanism on the frame of the tractor near the driver's seat.

4. The combination in a tractor having a frame and front and rear wheels; front and rear cross beams secured to the frame; longitudinal seat beams secured to said cross beams; platforms on the beams; a third transverse beam located between the other two beams and secured to the frame, said last-mentioned beam having depending hangers for aiding the said beams in supporting the platforms; a transplanting frame located on each side of the tractor between the said hangers and the front wheels; a plant box located above each platform and detachably secured to the hanger on that side of the tractor.

5. The combination in a tractor having front and rear axles; wheels on the axles; two seats carried by the tractor, one at each side thereof and spaced from the tractor; and a furrow marker and two compacting wheels located on each side of the tractor, between the body of the tractor and the seats, said mechanism located between the front of the tractor and the rear wheels thereof.

BENJAMIN C. ENGLAND.